United States Patent
Ashley et al.

(10) Patent No.: US 12,311,513 B2
(45) Date of Patent: May 27, 2025

(54) RAM GUIDE FOR A CRIMPER

(71) Applicant: Milwaukee Electric Tool Corporation, Brookfield, WI (US)

(72) Inventors: Johnathan Ashley, Brookfield, WI (US); Marc D'Antuono, Whitefish Bay, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 367 days.

(21) Appl. No.: 17/733,314

(22) Filed: Apr. 29, 2022

(65) Prior Publication Data

US 2022/0347823 A1 Nov. 3, 2022

Related U.S. Application Data

(60) Provisional application No. 63/182,612, filed on Apr. 30, 2021.

(51) Int. Cl.
*B25B 27/10* (2006.01)
*B25B 27/02* (2006.01)
*H01R 43/042* (2006.01)

(52) U.S. Cl.
CPC ............ *B25B 27/026* (2013.01); *B25B 27/10* (2013.01); *H01R 43/0427* (2013.01)

(58) Field of Classification Search
CPC .. B21D 39/046; B21D 39/048; H01R 43/042; H01R 43/0427; B25B 27/026; B25B 27/10

See application file for complete search history.

(56) References Cited

U.S. PATENT DOCUMENTS

| | | | | |
|---|---|---|---|---|
| 2,968,202 | A * | 1/1961 | Evans | H01R 43/0427 81/301 |
| 4,292,833 | A * | 10/1981 | Lapp | H02G 1/00 72/416 |
| 5,062,290 | A * | 11/1991 | Hoover | H01R 43/0427 100/231 |
| 7,124,619 | B1 * | 10/2006 | Lefavour | B25B 27/10 72/416 |
| 7,640,780 | B2 | 1/2010 | Ruland | |
| 7,788,962 | B2 | 9/2010 | Chiasson et al. | |
| 7,841,223 | B2 | 11/2010 | Rollins et al. | |
| 7,926,321 | B2 | 4/2011 | Rollins et al. | |
| 9,162,353 | B2 * | 10/2015 | Ciotti | B25B 27/10 |
| 9,166,353 | B1 | 10/2015 | Doornbos | |
| 9,722,334 | B2 | 8/2017 | Sterling et al. | |
| 9,774,159 | B2 * | 9/2017 | Hamm | H01R 43/0427 |
| 9,960,509 | B2 | 5/2018 | Sterling et al. | |
| 9,993,885 | B2 | 6/2018 | Frenken | |
| 10,058,989 | B2 | 8/2018 | Chellew | |
| 10,093,012 | B2 * | 10/2018 | Koski | H01R 43/048 |
| 10,109,971 | B2 | 10/2018 | Lefavour et al. | |

(Continued)

FOREIGN PATENT DOCUMENTS

WO 2017/120462 A1 7/2017

*Primary Examiner* — Edward T Tolan
(74) *Attorney, Agent, or Firm* — Quarles & Brady LLP

(57) ABSTRACT

Embodiments of the invention provide a ram guide for a crimping tool. The crimping tool includes a crimping head and a ram head. The ram guide includes a track and slot. The ram guide is configured to guide the ram head within a crimp portion of the crimping head to axially align the ram head with the crimping head.

9 Claims, 10 Drawing Sheets

(56) References Cited

U.S. PATENT DOCUMENTS

| | | |
|---|---|---|
| 10,600,584 B2 | 3/2020 | Chiasson et al. |
| 11,165,212 B1 * | 11/2021 | Chuan ................. F15B 15/1471 |
| 2013/0264085 A1 | 10/2013 | Ciotti |
| 2017/0057040 A1 | 3/2017 | Rzasa et al. |
| 2019/0123502 A1 | 4/2019 | Lefavour et al. |
| 2019/0160643 A1 | 5/2019 | Lefavour et al. |
| 2021/0159028 A1 | 5/2021 | Chiasson et al. |

* cited by examiner

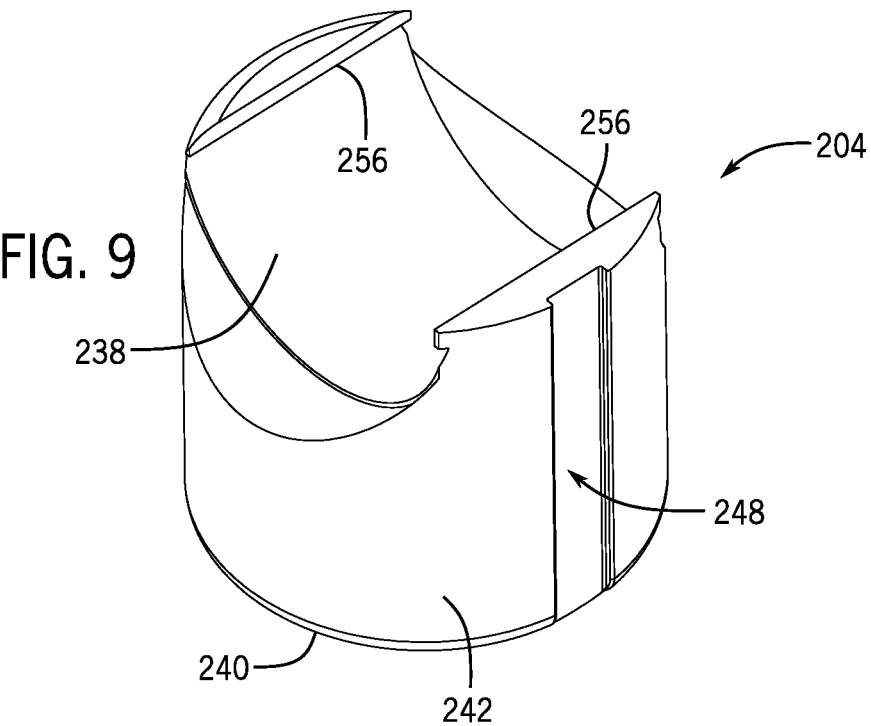
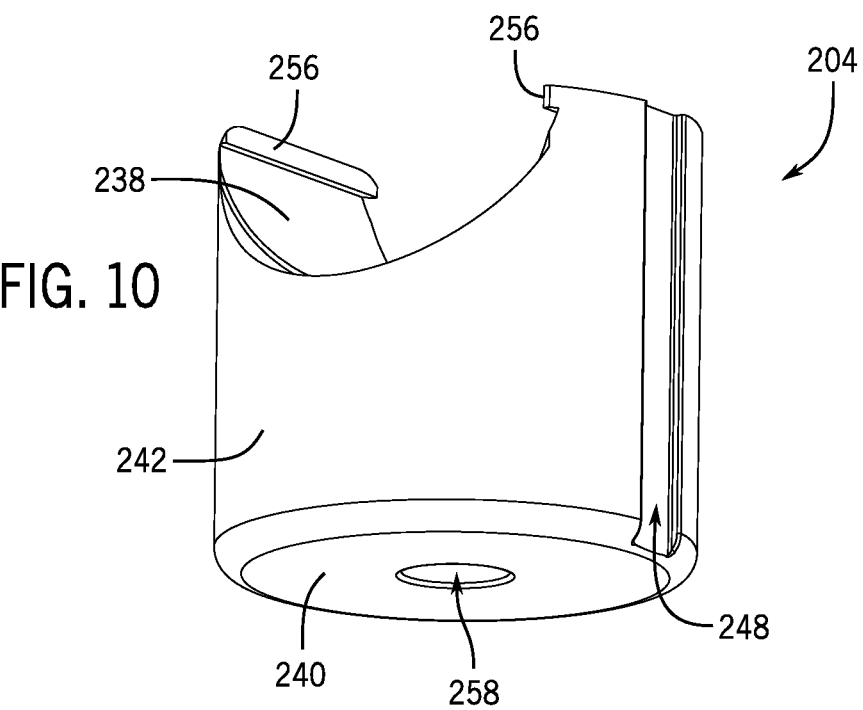

RAM GUIDE FOR A CRIMPER

RELATED APPLICATIONS

This application claims priority to U.S. Patent Application No. 63/182,612 filed Apr. 30, 2021 and entitled, "Ram Guide for a Crimper," which is hereby incorporated by reference in its entirety.

BACKGROUND

Crimpers and cutters often include a crimping or cutting head and certain crimping and cutting features, depending on the particular configuration of the tool. Some crimpers and cutters are hydraulic power tools that include a piston that can exert force on the crimping head, which may be used to move crimping features to perform crimp or compression work at a targeted crimp location. Some crimpers include a ram head that can be advanced by a hydraulic ram along a ram guide of the crimping head.

SUMMARY

Embodiments of the invention provide a crimping tool having a hydraulic ram. The crimping tool can include a crimping head. The crimping head can include a crimping head base and a crimp portion. A ram guide can extend between the crimping head base and the crimp portion of the crimping head. A ram can include a crimp surface, a base, a lateral surface extending between the crimp surface and the base, and a channel. The base can be configured to engage the hydraulic ram. The hydraulic ram can be configured to advance the ram head along the ram guide. The channel can be formed in the lateral surface, extend radially into the ram head, and extend axially between the crimp surface and the base. The channel can be dimensioned to engage the ram guide to maintain alignment between the ram head and the crimping head during a crimping action.

Some embodiments of the invention provide a crimping tool. The crimping tool can include a crimping head, a ram head, and a ram guide. The crimping head can include a base portion and a crimp portion. The base portion can define an internal cavity. The ram head can include a ram head body. The ram guide can be configured to guide the ram head between a retracted position and an extended position within the crimp portion. The ram guide can include a rail and a channel. The rail can extend axially along the base portion within the internal cavity and extending radially from the base portion into the internal cavity. The channel can be formed in the ram body and dimensioned to receive the rail while the ram head moves between the retracted position and the extended position. At least a portion of the ram head body can be disposed within the internal cavity of the base portion.

Some embodiments of the invention provide a crimping tool. The crimping tool can include a crimping head, a ram head, and a ram guide. The crimping head can include a base portion and a crimp portion. The ram guide can be configured to guide the ram head between a retracted position and an extended position within the crimp portion. The ram guide can include a track defining a narrow portion and a wide portion having a first curved transition therebetween. The first curved transition can be configured to provide a smooth transition for the ram head moving between the retracted position and the extended position. The track can extend axially within the crimp portion and can include a second curved transition proximate to the base portion. The ram head can include a slot dimensioned to receive the track therein and configured to axially aligned the ram head and the crimping head Some embodiments of the invention provide a ram guide for a crimping tool. The crimping tool includes a crimping head, a ram head, and a ram guide. The crimping head can include a base portion and a crimp portion. The ram guide can be configured to guide the ram head between a retracted position and an extended position within the crimp portion. The ram guide can include a track and a slot. The track can define a narrow portion and a wide portion having a curved transition therebetween. The curved transition can be configured to provide a smooth transition for the ram head moving from the retracted position to the extended position. The track can extend axially within the crimp portion and include a curved transition proximate to the base portion. The slot can be dimensioned to receive the track therein and can be configured to axially align the ram head and the ram guide.

In some embodiments, the crimping head can include a base portion and a crimp portion. The base portion can define an internal space. The ram head can have a ram head body. The ram guide can be configured to guide the ram head between a retracted position and an extended position within the crimp portion. The ram guide can include a rail and a channel. The rail can extend axially along the base portion within the internal space and extend radially from the base portion into the internal space. The channel can be formed in the ram head body and can be dimensioned to receive the rail, while the ram head moves between the retracted position and the extended position. At least a portion of the ram head body can be disposed within the internal space of the ram guide.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 9 is a top isometric view of a ram head of the crimping tool of FIG. 7.

FIG. 10 is a bottom isometric view of the ram head of FIG. 9.

DETAILED DESCRIPTION

Figure 1:
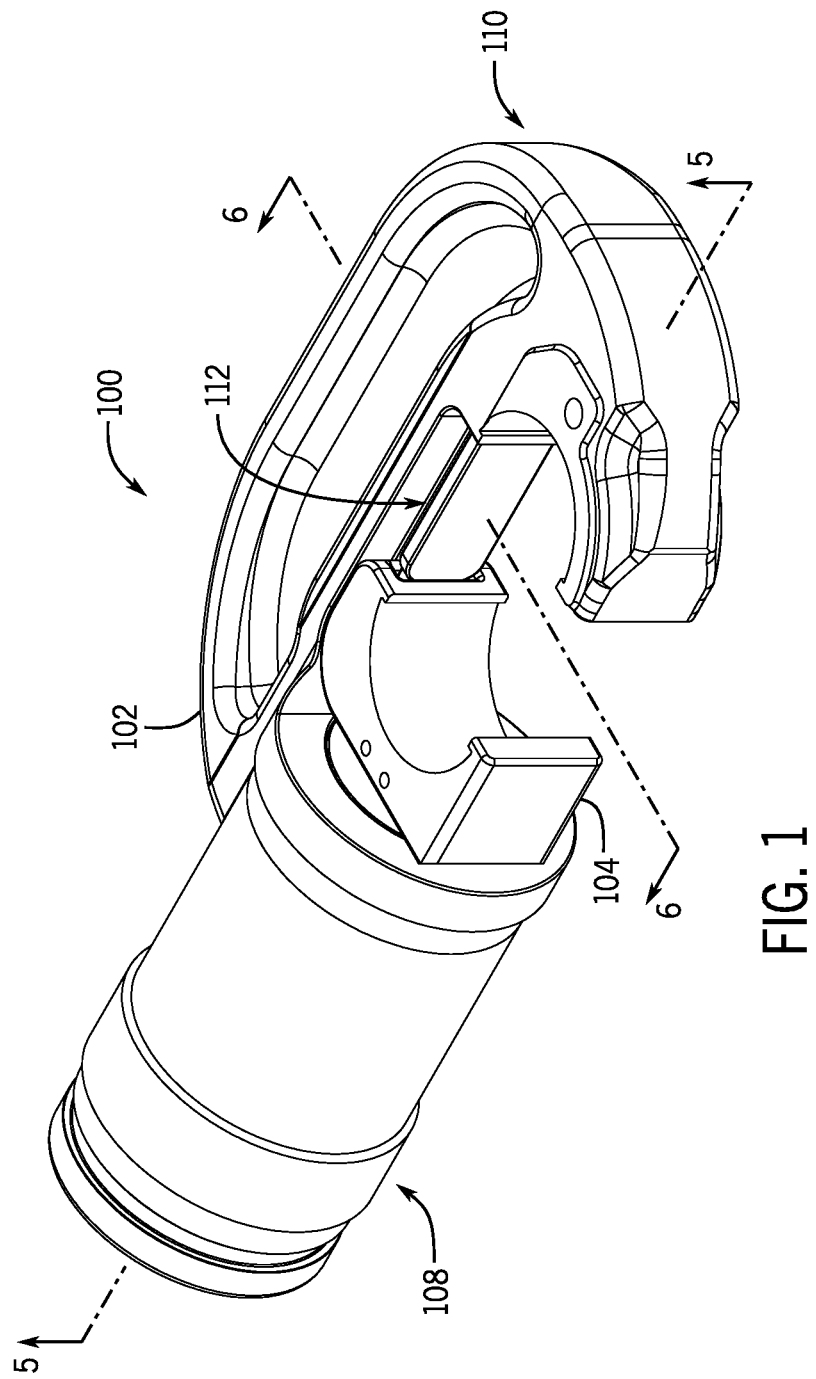
FIG. 1 is an isometric view of a crimping tool in a retracted position according to one embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, the terms "about," "approximately," and "substantially" as used herein with respect to a reference vale refer to variations from the reference valve of ±5%, inclusive.

A ram guide for a crimping tool is described below. Some crimping tools include a crimping head and a ram head that can be used to create an indent or crimp on a work piece, such as a connector, for example. It can generally be useful to have a ram guide for the ram head to move along to align the crimp. The ram guide is configured to guide the ram head within a crimp portion of the crimping head to axially align the ram head with the crimping head and resist off center loading during a crimping action.

FIG. 1 illustrates a crimping tool 100 according to one embodiment of the invention. In some embodiments, the crimping tool 100 may be used with a hydraulic hand tool. As shown in FIG. 1, the crimping tool 100 includes a crimping head 102 and a ram head 104. The crimping head 102 is configured as a C-head and includes a base portion 108 and a crimp portion 110. The ram head 104 is movable along a ram guide 112 between a retracted position, as illustrated in FIG. 1, and an extended position (see, for example, FIG. 5).

Figure 2:
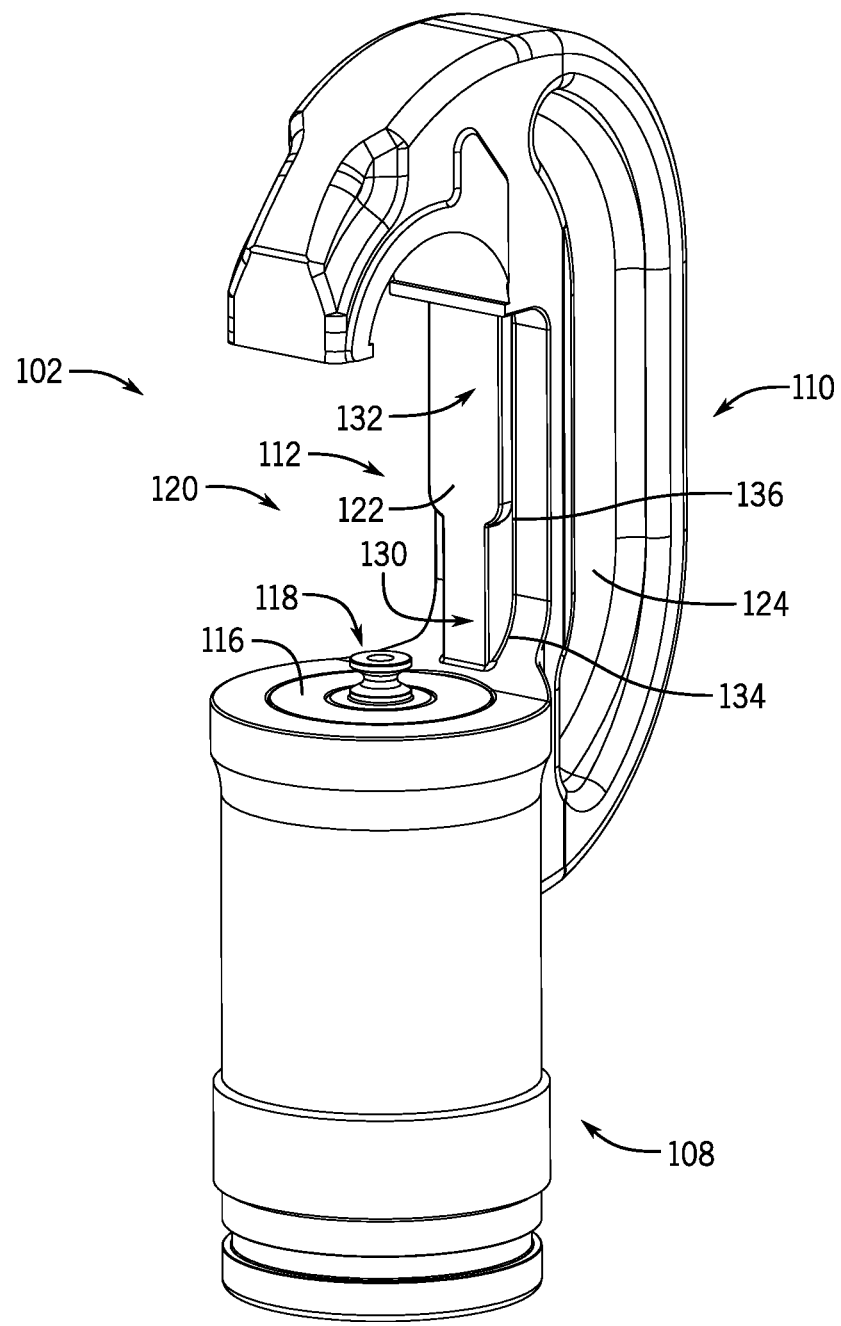
FIG. 2 is an isometric view of a crimping head of the crimping tool of FIG. 1.

FIG. 2 illustrates the crimping head 102 of FIG. 1. A hydraulic ram 116 extends within the crimping head 102 through the base portion 108 and into the crimp portion 110. The hydraulic ram 116 is configured to be driven by a hydraulic actuation assembly (not shown) to advance and retract the ram head 104 within the crimp portion 110. The hydraulic ram 116 includes a coupling end 118 to which the ram head 104 can be secured. The coupling end 118 extends at least partially into a work zone 120 (i.e., an area in which a work piece would be inserted into the crimping tool 100 to receive a crimp) of the crimping head 102.

As also shown in FIG. 2, the ram guide 112 includes a track 122 extending axially along a neck 124 of the crimp portion 110. The track 122 faces the work zone 120 of the crimping head 102. The track 122 protrudes radially inward (i.e., toward the work zone 120) from the neck 124 to define a track height. The track 122 includes a first portion 130 and a second portion 132, the first portion 130 being closer to the hydraulic ram 116 when the hydraulic ram 116 is in the retracted position. The first portion 130 defines a first width in a direction that is perpendicular to an axis of the base portion 108 of the crimping head 102 and the second portion 132 defines a second width in the direction that is perpendicular to the axis of the base portion 108. In the illustrated embodiment, the first width is less than the second width so that the first portion 130 is narrower than the second portion 132.

As further shown in FIG. 2, the track 122 extends along a length of the neck 124 that faces the work zone 120, and the first portion 130 terminates at a curved interface 134 of the neck 124 proximate the base portion 108 within the work zone 120. The curved interface 134 can provide a smooth transition between the neck 124 and the base portion 108 within the work zone 120 so that the ram head 104 can be easily moved in and out of the work zone 120. The track 122 also includes a curved transition 136 between the first portion 130 and the second portion 132. Like the curved interface 134, the curved transition 136 can provide a smooth transition between the first portion 130 and the second portion 132 as the ram head 104 moves along the track 122 from a retracted position to an extended position.

Figure 3:
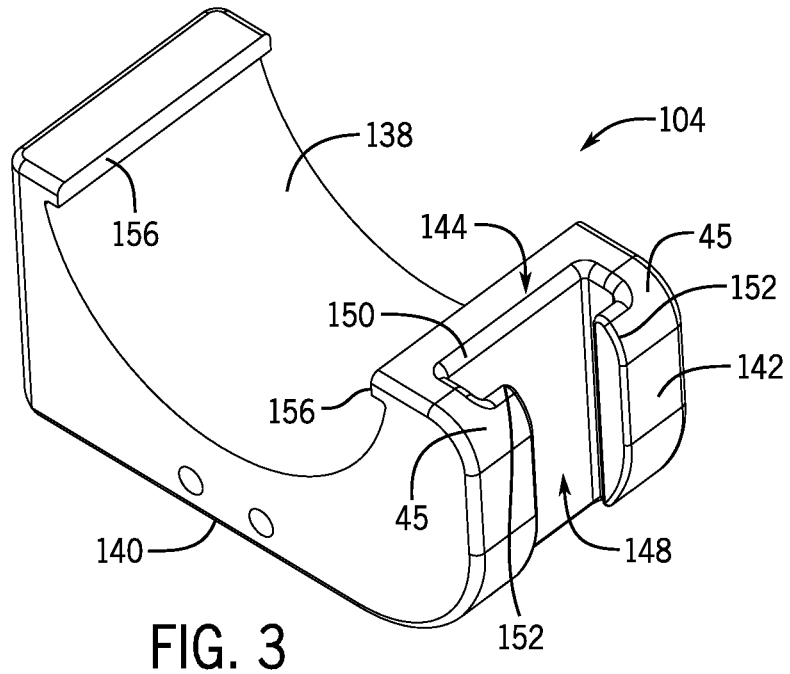
FIG. 3 is a top isometric view of a ram head of the crimping tool of FIG. 1.
Figure 4:
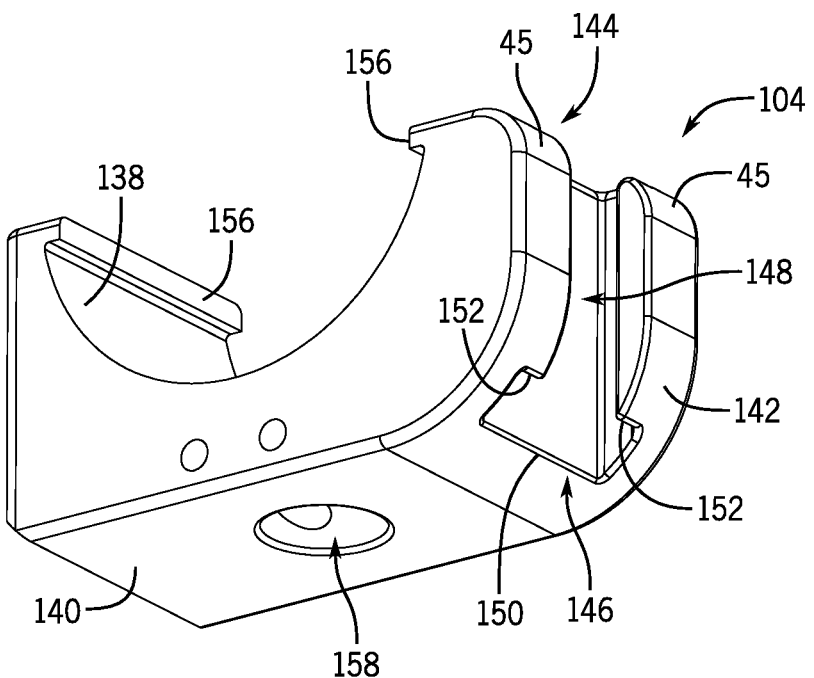
FIG. 4 is a bottom isometric view of the ram head of FIG. 3.

FIGS. 3 and 4 illustrate the ram head 104 of FIG. 1. The ram head 104 includes a crimp surface 138 and a base 140 opposite the crimp surface 138. Separate from the crimp surface 138 and the base 140 is a curved wall 142. The curved wall 142 at least partially defines a geometry that is similar to a geometry of the crimp portion 110 of the crimping head 102 within the work zone 120 at the curved interface 134 between the neck 124 and the base portion 108. For example, the curved wall 142 can extend parallel to the portion of the base portion 108 of the crimping head 102 at the curved interface 134. The curved wall 142 extends between a top portion 144 and a bottom portion 146. The top portion 144 is disposed near the crimp surface 138 and the bottom portion 146 is disposed near the base 140.

As also shown in FIGS. 3 and 4, the curved wall 142 of the ram head 104 includes a slot 148 formed therein. The slot 148 extends between the top portion 144 and the bottom portion 146. The slot 148 is generally formed as a T-slot or channel and includes a T-shaped end 150 at each of the top portion 144 and the bottom portion 146. The slot 148 is at least partially defined by first and second legs 152 that extend generally into the slot 148 from the curved wall 142. The slot 148 extends into the ram head 104 at the curved wall 142 to define a slot height. In some embodiments, the slot height corresponds to the height of the track 122 so that the track 122 can be received by the slot 148, as will be described in further detail below with reference to FIG. 6.

In some embodiments, the top portion 144 can further include a curved corner 145. The curved corner 145 can facilitate inserting the ram head 104 into the crimping head 102. For example, in use, the ram head 104 may be tipped so that the curved corner 145 engages crimping head 102 near the ram guide 112 first (i.e., before the rest of the ram head 104). The ram head 104 can then be pivoted about the curved corner 145 so that the slot 148 can receive the lower portion 130 of the ram guide 112. The curved corner 145 and allow a smooth rocking or pivoting motion of the ram head 104 so that the ram head 104 can quickly and smoothly secured to the crimping head 102.

As shown in FIG. 3, the crimp surface 138 is configured as a curved surface that extends between first and second ledges 156. In use, a work piece may be inserted into the crimp portion 110 of the crimping head 102, and the hydraulic ram 116 can move the ram head 104 from the retracted position to an extended position so that the crimp surface 138 engages the work piece and performs a crimp operation. As shown in FIG. 4, the base 140 of the ram head 104 includes a recess 158 configured to be secured to the coupling end 118 of the hydraulic ram 116. In some embodiments, the coupling end 118 of the hydraulic ram 116 can be bolted, pinned, press fitted, adhered, or otherwise secured to the base 140 of the ram head 104 at the recess 158.

Figure 5:
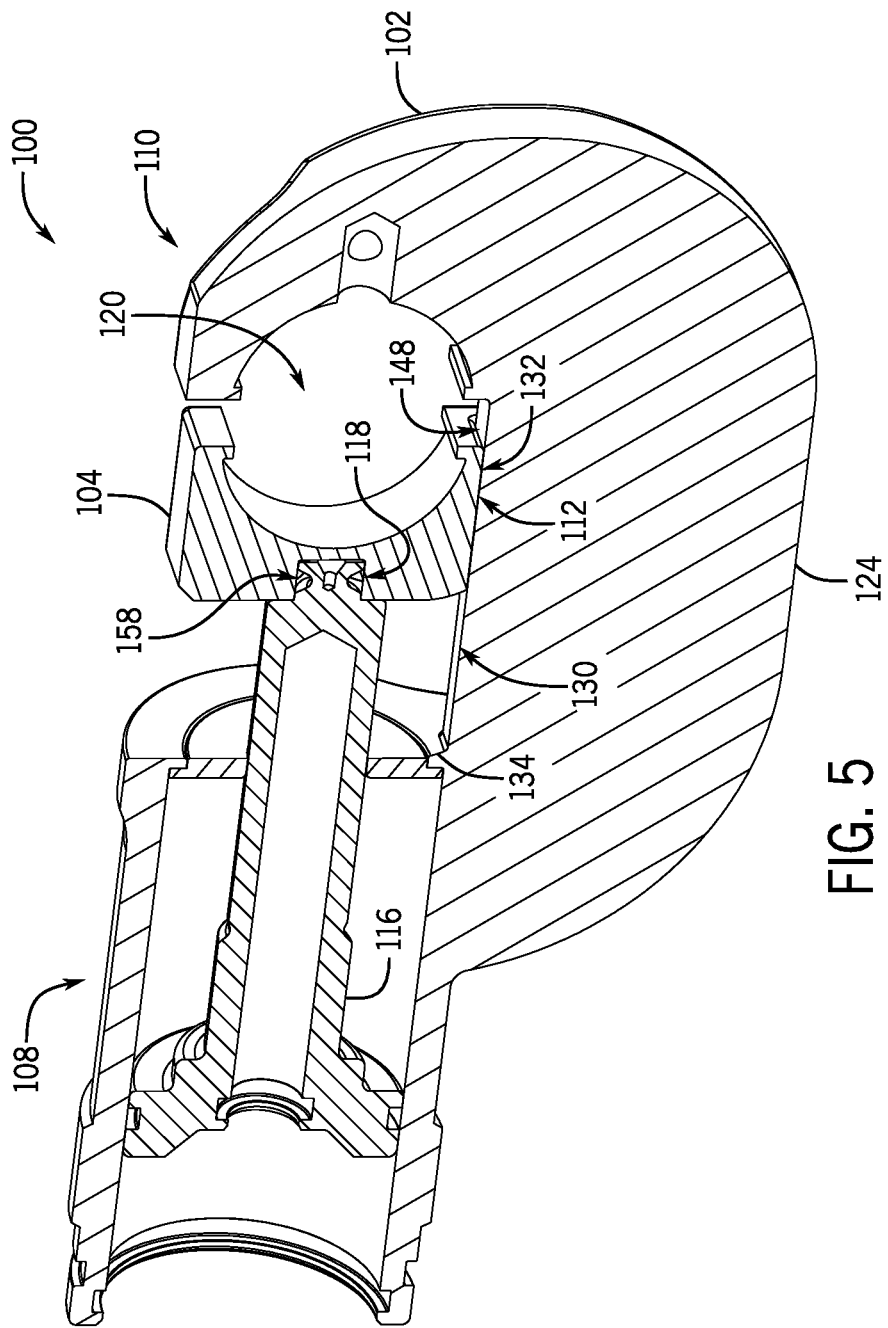
FIG. 5 is a cross-sectional isometric view of the crimping tool in an extended position, the cross section taken through line 5-5 of FIG. 1.

FIG. 5 illustrates a cross section of the crimping tool 100 in an extended position. Depending on the thickness of a work piece, the ram head 104 can extend within the crimp portion 110 of the crimping head 102 anywhere between the retracted position and a fully extended position (e.g., at least one of the first and second ledges 156 contacting a stop of the crimping head within the work zone 120). In use, as the ram head 104 extends within the crimp portion 110, the slot 148 is guided along the track 122. The track 122 can help to align the ram head 104, and generally align the crimping action on a work piece and resist off center loading. For example, the engagement of the slot 148 with the track 122 can help prevent or reduce movement of the ram head 104 laterally out of alignment within the crimp portion 110 of the crimping head 102. In general, the track 122 can extend circumferentially within the slot 148 to prevent the ram head 104 from rotating relative to the crimping head 102.

Figure 6:
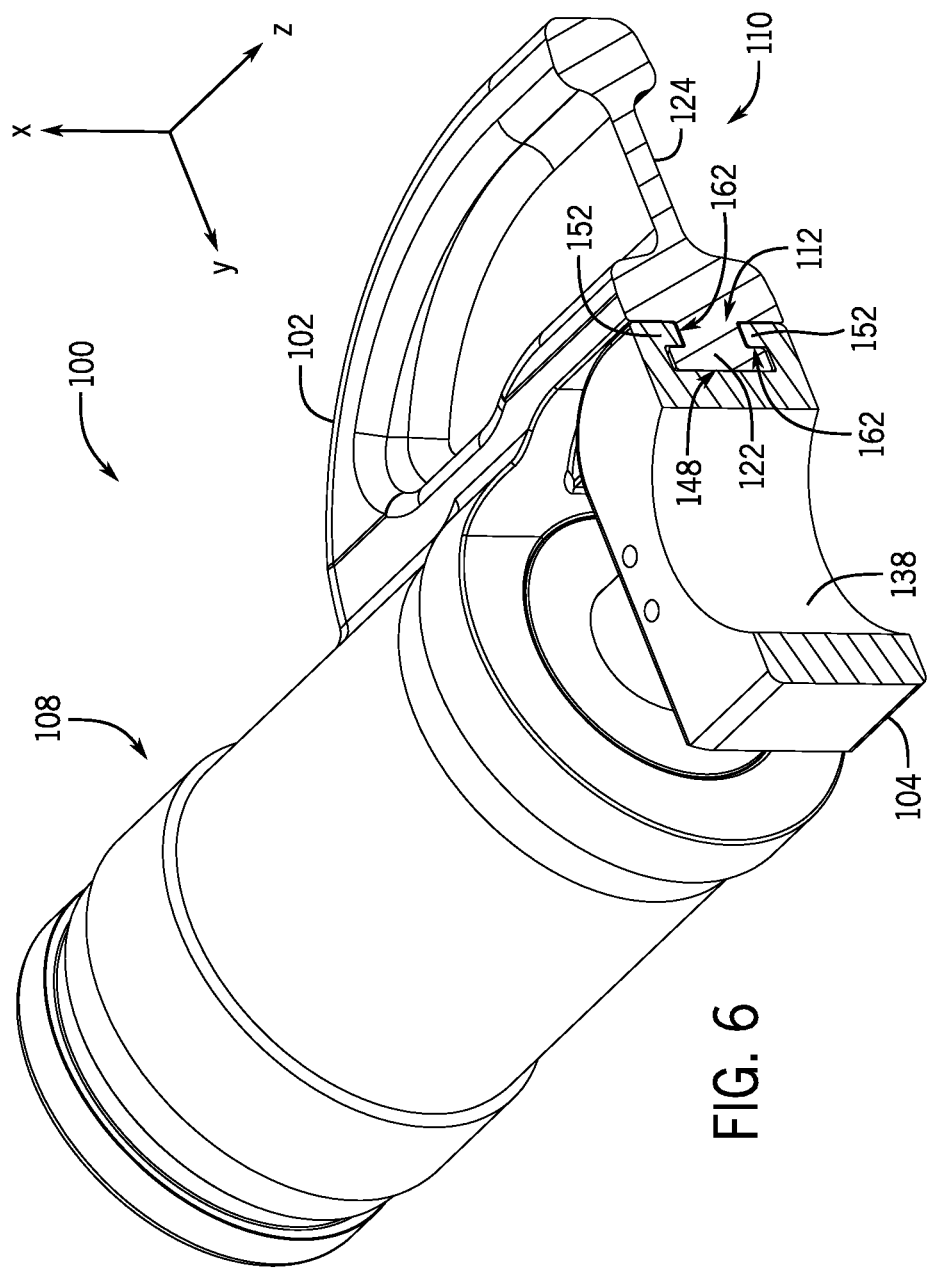
FIG. 6 is a cross-sectional isometric view of the crimping tool in an extended position, the cross section taken through line 6-6 of FIG. 1.

FIG. 6 illustrates a cross section of the crimping tool 100 and the engagement of the first and second legs 152 of the ram head 104 with the track 122 of the crimping head 102. The track 122 is configured as a T-track that defines a T-shaped profile. The track 122 includes first and second undercuts 162 formed by the T-shaped profile along the second portion 132 of the track 122. Each of the first and second legs 152 of the ram head 104 extend into respective first and second undercuts 162 to secure the ram head 104 relative to the crimping head 102. The track 122 is dimensioned to generally fully occupy (e.g., at least 90%) the opening formed by the slot 148 of the ram head 104 in a lateral direction (i.e., the x-direction) when the ram head 104 is positioned along the second portion 132 of the track 122. In contrast, when the ram head 104 is positioned along the first portion 130 of the track 122 (e.g., in a fully-retracted position), the first and second legs 152 are free to disengage (i.e., in the y-direction) from the track 122 to remove the ram head 104 from the ram guide 112.

In use, the ram head 104 moves from a retracted position to an extended position in the z-direction. As the ram head 104 extends, the crimp surface 138 can engage a work piece. As the crimp surface 138 engages the workpiece, forces in a variety of directions may be imparted on the ram head 104. A counterforce provided by the hydraulic ram can prevent the ram head 104 from moving in the z-direction toward a retracted position. A counterforce provided by the engagement of the legs 152 of the ram head 104 with the track 122 of the crimping head 102 can prevent the ram head 104 from moving laterally in the x-direction and radially in the y-direction. Such counterforces allow the ram head 104 to provide a straight (e.g., square) crimp on the work piece. Providing a square crimp can be useful to reduce uneven wear on the crimping tool 100 and to produce a reliable crimp on the work piece.

As described above with respect to FIG. 2, the track 122 can include the curved transition 136 between the narrowed first portion 130 and the wider second portion 132. Like the curved interface 134, the curved transition 136 can advantageously provide a smooth transition between the first portion 130 and the second portion 132 as the ram head 104 moves along the track 122 in the z-direction. The smooth transition allows the hydraulic ram 116 to provide a constant extending force to the ram head 104 without the ram head catching or otherwise getting hung up on the transition from the narrow part of the track 122 to the wider part of the track 122. The constant extending force can be useful to prevent overworking or unequal power draw from the power source of the hydraulic ram 116. Similar advantages can apply to the curved interface 134.

Figure 7:
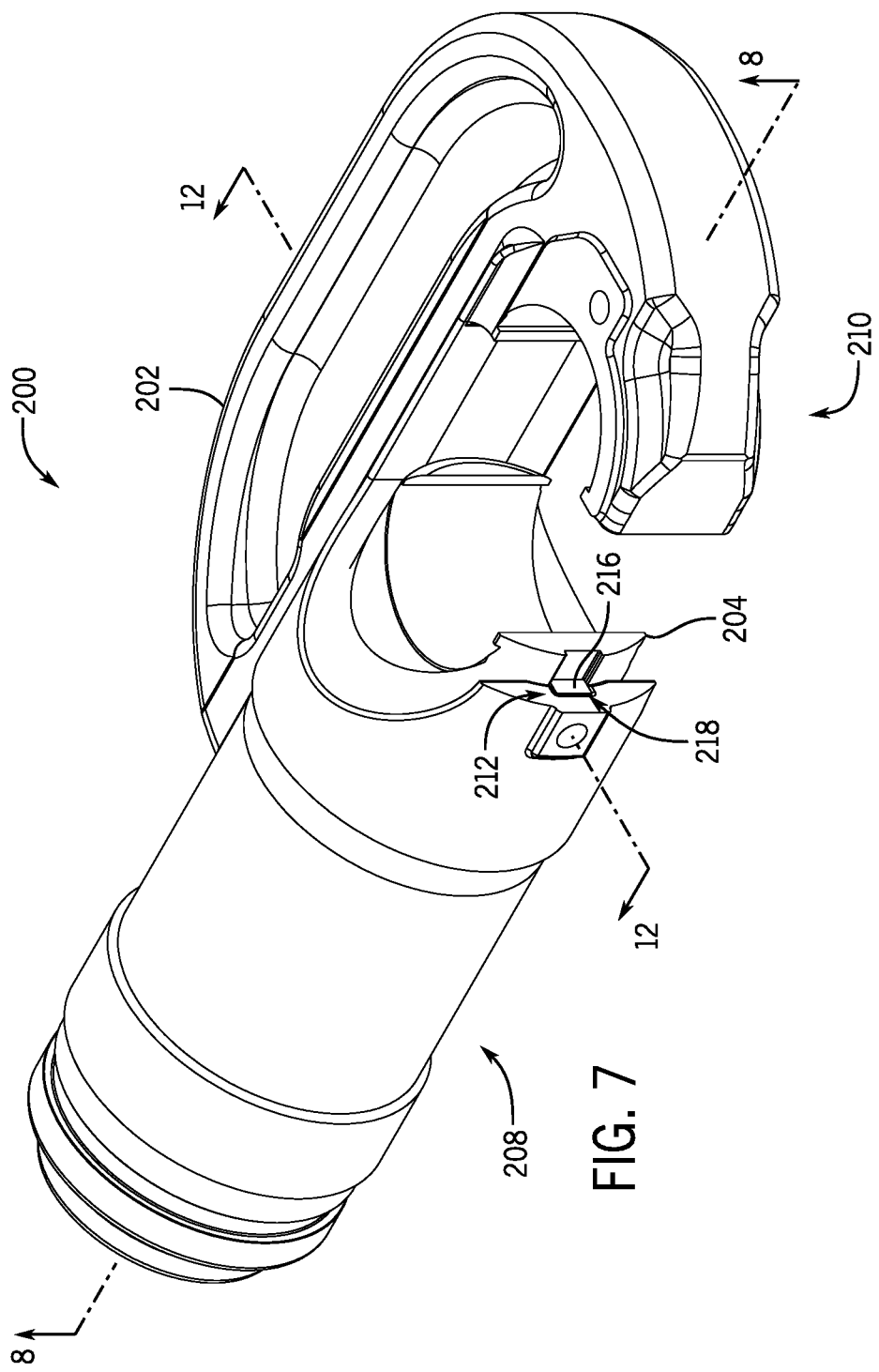
FIG. 7 is an isometric view of another crimping tool in a retracted position according to an embodiment of the invention.

FIG. 7 illustrates a crimping tool 200 according to another embodiment of the invention. Similar to the crimping tool 100, the crimping tool 200 may be used with a hydraulic hand tool. As shown in FIG. 7, the crimping tool 200 includes a crimping head 202 and a ram head 204. The crimping head 202 is configured as a C-head and includes a base portion 208 and a crimp portion 210. The ram head 204 is movable within the crimp portion 210 along a ram guide 212 between a retracted position and an extended position. In the illustrated embodiment, the ram guide 212 includes a rail 216 configured as a track that extends along a slot 218 formed in an internal surface of the base portion 208 of the crimping head 202. The base portion 208 forms a cavity within the crimping tool 200, which is separate from the crimping zone and closed at one axial end by the ram head 204.

Figure 8:
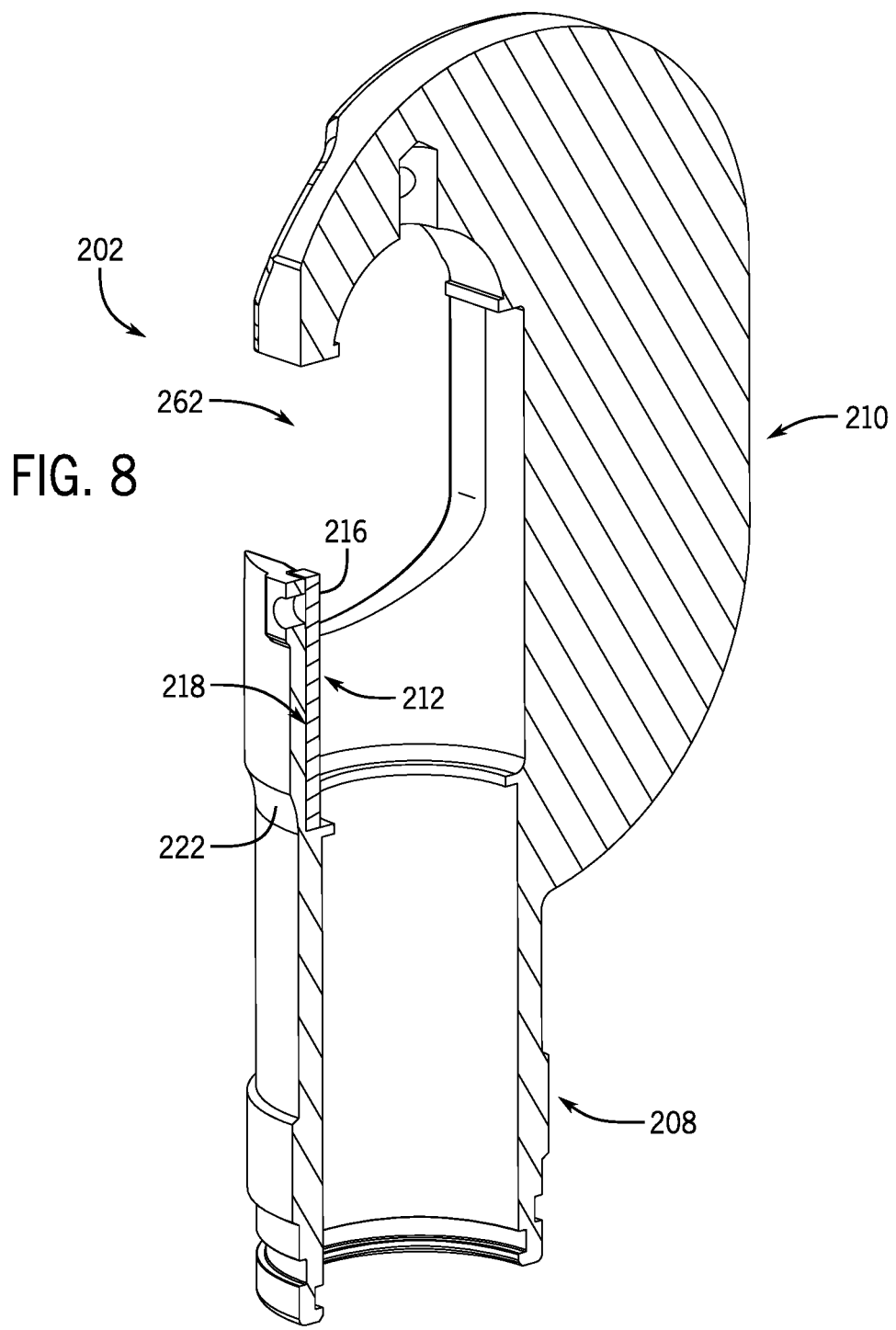
FIG. 8 is a cross-sectional isometric view of a crimping head of the crimping tool of FIG. 7 taken through line 8-8.

FIG. 8 illustrates the crimping head 202 of FIG. 7. The slot 218 extends axially along the base portion 208 along a side wall and defines a slot depth. In the illustrated embodiment, the slot 218 extends internally along the base portion 208 from the crimp portion 210 to a first contour 222 of the base portion 208, however, other configurations are possible. The slot 218 is configured to receive the rail 216 of the ram head 204. The rail 216 defines a radial width. The radial width of the rail 216 is greater than the slot depth so that the rail 216 extends radially inward into the internal volume of the base portion 208 from the slot 218. The rail 216 can be bolted, pinned, adhered, press fitted, or otherwise secured within the slot 218. In some embodiments, the rail 216 may be secured axially within the slot 218 via a bolt that extends through an opening formed in an outer surface of the base portion 208 of the crimping head 202.

In some embodiments, the rail 216 may be removable, selectively fixable, and thus, replaceable. In some instances, the rail 216 may be replaced as part of maintenance or to accommodate a variety of ram heads. For example, different ram heads may have different geometries and require an appropriate corresponding rail. In particular, different ram heads may include different depths of channels (see, for example, the channel 248 of the ram head 204 of FIGS. 9 and 10), and thus require a rail having a particular thickness in the radial direction, which may be inserted and coupled to the crimping head 202.

In use, to secure the rail 216 to the crimping head 202, the rail 216 may be inserted into the slot 218 until an axial end of the rail 216 abuts the contour 222 of the base portion 208. The contour 222 of the base portion 208 can be configured as an annular interior ledge that prevents the rail 216 from over-extending into the base portion 208. The contour 222 can provide a stop for both the rail 216 and a bottom portion of the ram head body 204. The contour 222 can be integrally formed with the base portion 208 at a set distance below the work zone. Since the rail 216 may be replaced within the crimping head 202, a variety of lengths of rails may be used to accommodate a variety of ram heads.

As also shown in FIG. 8, the base portion 208 is configured as a hollow cylinder. The base portion 208 can house a hydraulic ram 226 (see, for example, FIG. 11). The hydraulic ram 226 can be configured to be driven by a hydraulic actuation assembly (not shown) to advance and retract the ram head 204 within the crimp portion 210. The base portion 208 is also dimensioned to receive at least a portion of the ram head 204. In particular, when the ram head 204 is in the retracted position, a majority of the ram head 204 may be received by the base portion 208 of the crimping head 202.

FIGS. 9 and 10 illustrate the ram head 204 of FIG. 7. The ram head 204 includes a crimp surface 238 and a base 240 opposite the crimp surface 238. An outer wall 242, configured as a curved lateral surface, extends between the crimp surface 238 and the base 240. The outer wall 242 includes a channel 248 formed therein. The channel 248 defines a channel depth in a radial direction. The channel depth may be less than the radial width of the rail 216. For example, the channel depth may be approximately (e.g., within 90%) of the difference between the radial width of the rail 216 and the slot depth of the slot 218 formed in the base portion 208 of the crimping head 202 so that the outer wall 242 is generally flush with an inner wall of the base portion 208 (see, for example, FIG. 12). In some embodiments, the outer wall 242 can be substantially parallel to the inner wall of the cavity defined by the base portion 208.

As shown in FIG. 9, the crimp surface 238 is configured as a curved surface that extends between first and second ledges 256. In use, a work piece may be inserted into the crimp portion 210 of the crimping head 202 and the hydraulic ram 226 can move the ram head 204 from the retracted position to an extended position so that the crimp surface 238 engages the work piece and performs a crimp operation. As shown in FIG. 10, the base 240 of the ram head 204 includes a recess 258 configured to engage a coupling end of the hydraulic ram 226.

Figure 11:
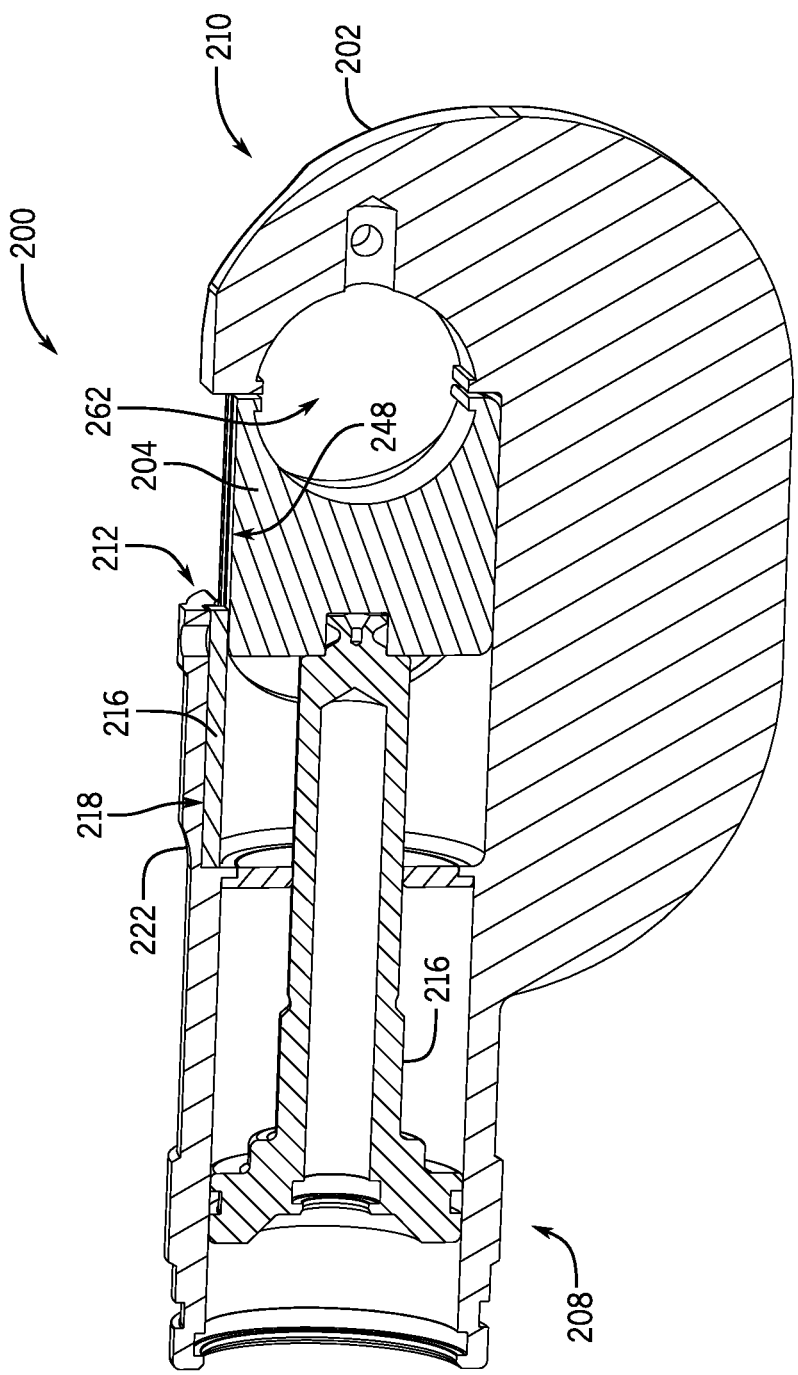
FIG. 11 is a cross-sectional isometric view of the crimping tool in an extended position, the cross section taken through line 8-8 of FIG. 7.

FIG. 11 illustrates a cross section of the crimping tool 200 in an extended position. Depending on the thickness of a work piece, the ram head 204 can extend within the crimp portion 210 of the crimping head 202 anywhere between the retracted position and a fully extended position. In use, as the ram head 204 extends within the crimp portion 210, the channel 248 is guided along the rail 216. In some extended positions, a portion of the channel 248 may be disengaged from (i.e., not in contact with) the rail 216. The ram guide 212 (i.e., the rail 216 and the channel 248) can align the ram head 204, and generally align the crimping action on a work piece and advantageously resist off center loading. For example, the engagement of the rail 216 with the channel 248 can help reduce or prevent movement of the ram head 204 radially out of alignment with the crimp portion 110 of the crimping head 102 and promote axial alignment of the ram head 204 with the crimping head 202.

As shown in FIGS. 9 and 10, the outer wall 242 defines a body height of the ram head 204 in an axial direction. As shown in FIG. 11, the body height of the ram head 204 is greater than an axial height of a portion of a work zone 262 defined by the crimp portion 210 of the crimping head 202. In particular, the body height of the ram head 204 allows the channel 248 to remain engaged with the rail 216 while the ram head 204 is in the retracted position, the fully extended position, and any intermediate positions between the retracted and fully extended position. Additionally, in the illustrated embodiment, the height of the ram head 204 allows a portion of the ram head 204 to remain within the cavity of the base portion 208, even in the fully extended position.

Figure 12:
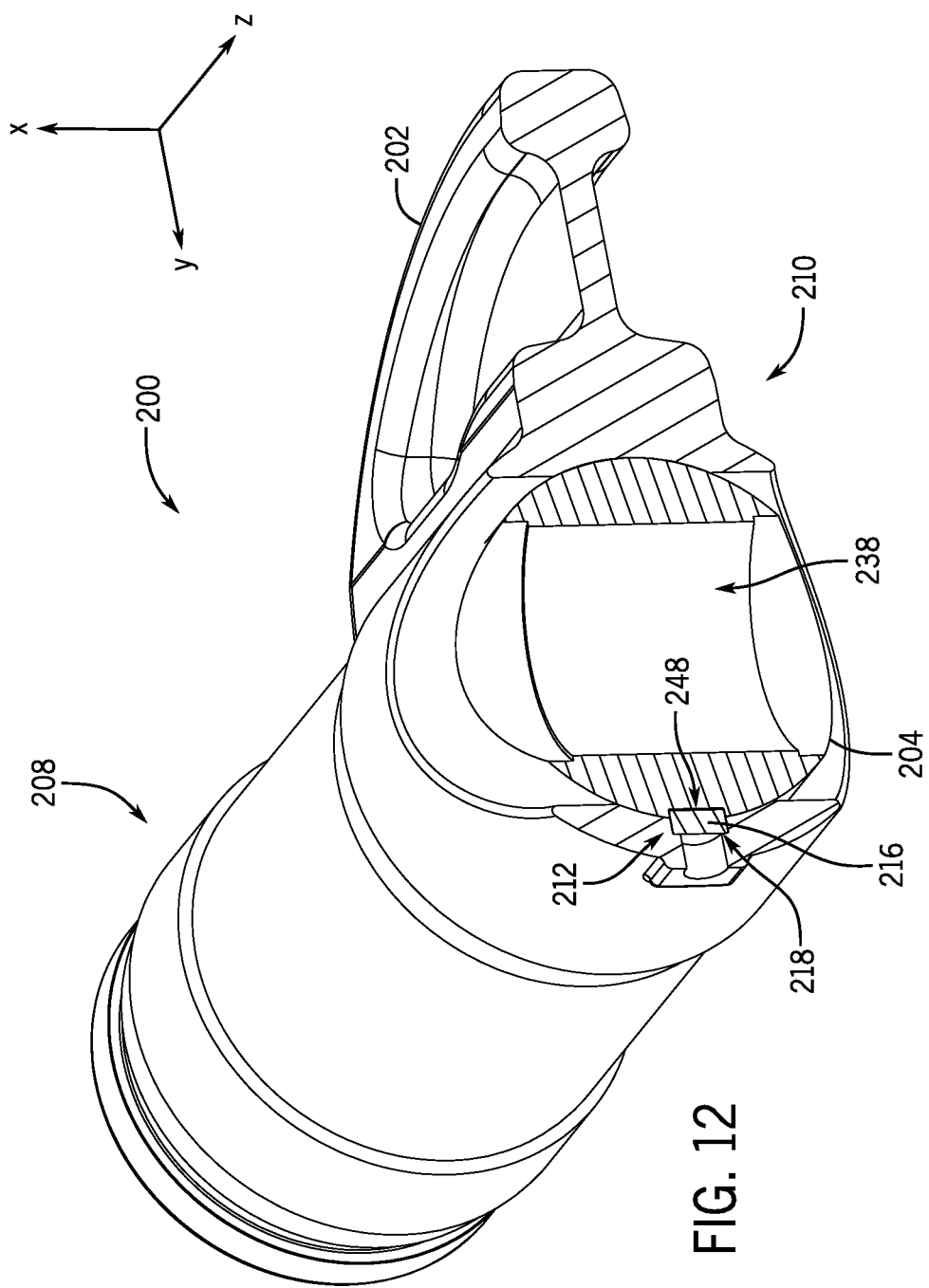
FIG. 12 is a cross-sectional isometric view of the crimping tool in the retracted position, the cross section taken through line 12-12 of FIG. 7.

FIG. 12 illustrates a cross section of the crimping tool 200 and the engagement of the rail 216 with each of the slot 218 and the channel 248. The rail 216 is dimensioned to generally occupy (e.g., at least 90%) of each of the slot 218 formed in the crimping head 202 and the channel 248 formed in the ram head 204 in a lateral direction (i.e., the x-direction).

In use, the crimping head can move from a retracted position to an extended position (and vice versa) by travelling along the z-direction. The engagement of the rail 216 within the channel 248 of the ram head 204 prevents movement of the ram head x-direction (with respect to FIG. 12) and generally promotes concentric alignment with the base 208 of the crimping head 202. As shown, the rail 216 is disposed opposite the neck of the crimping head 202 from the ram head 204. This orientation of the rail 216 relative to the neck can reduce any bending moment or pivot point formed at the engagement of the ram head 204 and the ram guide 212. For example, if a ram guide were formed on the same side of a ram head as a neck of the crimping head, the ram head may be allowed to pivot about an axis extending in the z-direction and out of alignment with the crimping head. Thus, it is generally advantageous to separate the rail 216 approximately 180 degrees about the z-axis from the neck of the crimping head 202 to maintain concentric alignment and reduce misalignment in the x and y-directions during a crimping action.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g. "one or the other but not both") when preceded by terms of exclusivity, such as "either," "one of," "only one of" or "exactly one of."

Various features and advantages of the disclosure are set forth in the following claims.

The invention claimed is:

1. A crimping tool, comprising:
a crimping head including a base portion and a crimp portion, the base portion defining an internal cavity;
a ram head having a ram head body; and
a ram guide configured to guide the ram head between a retracted position and an extended position within the crimp portion, the ram guide including:
a rail extending axially along the base portion within the internal cavity and extending radially from the base portion into the internal cavity; and
a channel formed in the ram head body dimensioned to receive the rail while the ram head moves between the retracted position and the extended position,
at least a portion of the ram head body being disposed within the internal cavity of the base portion, and
the base portion including a slot formed in an internal surface of the base portion that faces the internal cavity, the slot dimensioned to receive the rail and axially secure the rail relative to the base portion.

2. The crimping tool of claim 1, wherein the rail is bolted within the slot.

3. The crimping tool of claim 1, wherein a depth of the rail in a radial direction is greater than a depth of the slot in the radial direction.

4. The crimping tool of claim 3, wherein the depth of the rail in the radial direction is greater than a depth of the channel in the radial direction.

5. The crimping tool of claim 1, wherein the rail is a removable rail that can be selectively fixed to the crimping head.

6. The crimping tool of claim 1, wherein the base portion includes an interior ledge integrally formed with the crimping head and configured to abut an axial end of the rail.

7. The crimping tool of claim 6, wherein the interior ledge is an annular ring configured to abut the ram head body.

8. The crimping tool of claim 1, wherein the crimping head includes a neck and the rail is disposed 180 degrees from the neck about an axis that extends axially through the base portion.

9. The crimping tool of claim 1, wherein a portion of the channel is disengaged from the rail when the ram head is at an extended position.

* * * * *